Patented Aug. 18, 1942

2,293,214

UNITED STATES PATENT OFFICE 2,293,214

PURIFYING TETRAETHYL LEAD

Edward B. Peck, Elizabeth, N. J., assignor to Standard Oil Development Company, a corporation of Delaware No Drawing. Application August 3, 1940, Serial No. 351,252

4 Claims. (Cl. 260—437)

The present invention relates to improvements in the purification of lead tetraethyl, and also relates to recovering bismuth compounds as by-products in the process of purifying lead tetraethyl, as well as improving the quality of the lead tetraethyl as regards its stability against explosiveness.

As is known in the preparation of lead tetraethyl, the commercial process involves reacting together a sodium-lead alloy and ethyl chloride in the presence of a small amount of alcohol, which latter apparently has some catalytic effect. Invariably the lead alloy contains a relatively small amount of bismuth and during the lead tetraethyl syntheses the bismuth is alkylated to form predominantly triethyl bismuthine. After the reaction between the lead and the ethyl chloride is complete or has reached equilibrium, the mass is steam distilled to give a distillate containing crude lead tetraethyl, together with triethyl bismuthine. Triethyl bismuthine is a fuming oil, distilling unchanged at 107° C., at 79 mm. pressure and exploding when heated in air at ordinary pressure. It has a density of 1.82. Due to the explosive nature of this triethyl bismuthine, it is of course desirable to remove it from the lead tetraethyl which is a more stable compound, and my present invention is directed towards removing the triethyl bismuthine from the lead tetraethyl to increase the stability of the latter, and, furthermore, I recover the bismuth either in the form of pure metal or in the form of alkylated halo derivatives which may be employed as intermediates in the preparation of medicinal compounds or find other uses.

In my co-pending application, Serial No. 347,494, filed July 25, 1940, I have disclosed and claimed a process for recovering bismuth from the crude tetraethyl which has been removed by steam distillation from the reaction mass in which it is formed, and the recovery there described is one in which the crude lead tetraethyl containing also organo-bismuth compounds is treated with an oxidizing agent to remove oxidized derivatives of triethyl bismuthine and possibly oxygen-containing lead alkyl compounds in the form of a sludge, which sludge is subsequently treated to recover metallic bismuth.

One object of the present invention is to prepare a lead tetraethyl composition which is more stable against explosions than lead tetraethyl compositions heretofore prepared.

Another object of the present invention is to recover metallic bismuth from the reaction mass in which lead tetraethyl is formed.

Other and further objects of my invention will appear from the following more detailed description.

I first react a sodium lead alkylate with ethyl chloride, preferably in the presence of a catalyst such as a small amount of ethyl alcohol. The lead used in the production of the sodium lead alloy usually contains from 0.1 to 3.0% bismuth which reacts with the ethyl chloride in manner similar to that of lead. The reactions involved may be represented by the following equations:

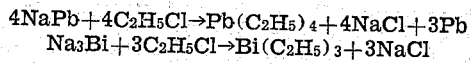

$$4NaPb + 4C_2H_5Cl \rightarrow Pb(C_2H_5)_4 + 4NaCl + 3Pb$$
$$Na_3Bi + 3C_2H_5Cl \rightarrow Bi(C_2H_5)_3 + 3NaCl$$

The reaction mass is then steam distilled to separate lead tetraethyl. This distillate comprises crude lead tetraethyl containing unstable metal organic compounds, among which is bismuth triethyl.

The distillate is then treated with a dealkylating agent which converts the unstable metal alkyls into salts which are insoluble in tetraethyl lead and which may be removed by filtration. An effective group of dealkylating agents are the halides ranging from the alkyl halides and hydrochloric acid, to the chlorides of amphoteric or weakly basic metals. The stronger dealkylating agents such as hydrochloric acid and certain metallic chlorides of which mercuric chloride is an example, are not preferred because they may dealkylate tetraethyl lead itself. A preferred dealkylating agent is bismuth chloride which is selective in its action toward the bismuth triethyl and the other more unstable metal organic compounds. The latter reaction may be represented by the equation:

$$Bi(C_2H_5)_3 + BiCl_3 \rightarrow C_2H_5BiCl_2 + (C_2H_5)_2BiCl$$

A precipitate of bismuth ethyl chloride and diethyl bismuth chloride settles out of the crude lead tetraethyl as a result of the reaction indicated above, and is removed preferably from the lead tetraethyl by filtration. The amount of the bismuth chloride added to the distillate containing the crude lead tetraethyl and the bismuth alkyl compounds is from about 2-3% by weight, and the mass should be stirred continuously for a period of say 20 minutes to one hour to permit the desired reaction to take place which reaction takes place at room temperature. Some lead alkyl compounds are also precipitated with the bismuth alkyl halides and it is believed that these are produced from unstable lead alkyls rather than from the decomposition of tetraethyl lead itself.

There are a large number of dealkylating agents that may be used for separating the bismuth alkyls and other unstable compounds from tetraethyl lead. The chlorides or iodides of iron, mercury (mercuric), cadmium, tin, zinc, etc. are effective in this dealkylation. Other satisfactory dealkylation agents are acids such as glacial acetic acid, hydrochloric acid and the like. The main feature of my invention rests on the dealkylation of bismuth triethyl to form salts insoluble in tetraethyl lead which may be removed to give a stable tetraethyl lead and solid bismuth compounds which may be converted to metallic bismuth or useful compounds.

The bismuth compounds separated in the above steps are contaminated with lead compounds such as alkyl lead chloride and where pure bismuth is to be recovered, the separation may be carried out according to conventional methods of separating bismuth and lead. As for example, the material may be dissolved in strong hydrochloric acid which completes the dealkylation process with the formation of bismuth chloride and paraffin hydrocarbons. These chlorides are then diluted with water whereby bismuth chloride is hydrolyzed to the insoluble bismuth oxychloride which is calcined and then reduced to metallic bismuth by means of carbon, hydrogen or any of the known reduction methods.

The lead tetraethyl from which the unstable lead tetraethyl and perhaps lead compounds have been removed is subjected to a finishing operation as, for instance, a steam distillation and thereafter dehydrated to yield a stable lead tetraethyl.

To recapitulate, my present invention is concerned with the problem of producing a stable lead tetraethyl and to recover bismuth and bismuth compounds from the lead tetraethyl producing process. In brief compass, my process involves treating the crude lead tetraethyl with a small amount, say 2-3%, of a compound, such as bismuth chloride or iron chloride, zinc chloride, and the like, to form bismuth complexes which precipitate out of the lead tetraethyl and may be removed by decantation or filtration. Hydrochloric acid, acetic acid, or similar acids may be used in this process, but these acids are apt to attack the tetraethyl lead and consequently I prefer to employ a compound such as bismuth chloride which I add to the lead tetraethyl and, as stated, cause the formation of bismuth ethyl chlorides which may be separated from the liquid lead tetraethyl by filtration or decantation. The bismuth ethyl chlorides separated from lead tetraethyl may be treated with an acid, such as hydrochloric acid, to form bismuth chloride and thereafter treated with an excess of water to form the oxychloride, which oxychloride may be calcined to form the oxide and later reduced by any known reducing agent to yield metallic bismuth. In dealkylating the bismuth alkyls, I operate at ordinary room temperature and pressure. For any given batch of crude lead tetraethyl, the actual amount of bismuth chloride required to be added to the batch could be determined by analyzing a small aliquot portion of the reaction mass to determine its bismuth content, and with that information the amount of the dealkylating agent necessary to precipitate the bismuth present in the entire mass could be readily calculated.

It will be obvious to those skilled in this art that numerous modifications of my invention may be made without departing from the spirit thereof.

For example, it is to be understood that the foregoing process for stabilizing lead tetraethyl and recovering bismuth from crude tetraethyl lead applies also to the process of preparing tetramethyl lead or mixtures of lead tetramethyl and tetraethyl or to any lead alkyl compound to stabilize the same and recover any bismuth present in the raw reaction mass.

What I claim is:

1. The method of improving lead tetraethyl as regards its stability against explosiveness and, at the same time recovering bismuth which comprises reacting a sodium-lead alloy containing bismuth with ethyl chloride to form a reaction mass containing crude tetraethyl lead and triethyl bismuthine, steam distilling the reaction mass to recover a distillate containing lead tetraethyl and triethyl bismuthine, treating the distillate with a dealkylating agent to form a bismuth salt insoluble in lead tetraethyl, and separating the two phases thus formed into stable lead tetraethyl and impure bismuth compounds.

2. The method of improving lead alkyl compounds as regards their stability and, at the same time, recovering bismuth which comprises reacting a sodium-lead alloy containing bismuth with an alkyl chloride, the reaction mass containing crude lead alkyl compounds and alkyl bismuthines, steam distilling the reaction mass to recover distillate containing lead alkyl compounds and alkyl bismuthines, treating the distillate with a dealkylating agent to form a bismuth salt insoluble in lead alkyl compounds, separating the two phases thus formed into stable alkyl lead compounds and impure bismuth compounds.

3. In the method of claim 1, the improvement which comprises steam distilling the separated lead tetraethyl and dehydrating the distillate to form a finished stable lead tetraethyl.

4. The method of improving lead alkyl compounds as regards their stability and, at the same time, recovering bismuth which comprises reacting a sodium-lead alloy containing bismuth with an alkyl chloride, the reaction mass containing crude lead alkyl compounds and alkyl bismuthines, steam distilling the reaction mass to recover distillate containing lead alkyl compounds and alkyl bismuthines, treating the distillate with bismuth chloride to form a bismuth salt insoluble in lead alkyl compounds, and separating the two phases thus formed into stable alkyl lead compounds and impure bismuth compounds.

EDWARD B. PECK.